(12) United States Patent
Sohoney et al.

(10) Patent No.: US 11,704,589 B1
(45) Date of Patent: Jul. 18, 2023

(54) AUTOMATICALLY IDENTIFYING DYNAMIC APPLICATIONS

(71) Applicant: Amazon Technologies, Inc., Seattle, WA (US)

(72) Inventors: Saurabh Sohoney, Bangalore (IN); Vineet Shashikant Chaoji, Bangalore (IN); Pranav Garg, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1,857 days.

(21) Appl. No.: 15/463,439

(22) Filed: Mar. 20, 2017

(51) Int. Cl.
*G06N 20/00* (2019.01)
*G06F 21/57* (2013.01)
*G06Q 30/06* (2023.01)
*G06Q 30/0601* (2023.01)

(52) U.S. Cl.
CPC .............. *G06N 20/00* (2019.01); *G06F 21/577* (2013.01); *G06Q 30/0601* (2013.01)

(58) Field of Classification Search
CPC .... G06N 20/00; G06F 21/577; G06Q 30/0601
See application file for complete search history.

(56) References Cited

U.S. PATENT DOCUMENTS

| | | | |
|---|---|---|---|
| 8,499,353 B2* | 7/2013 | Lockhart et al. |
| 8,850,589 B2* | 9/2014 | Pistoia et al. |
| 9,390,268 B1* | 7/2016 | Martini et al. |
| 2009/0077561 A1* | 3/2009 | Feng et al. |
| 2011/0283148 A1* | 11/2011 | Rossi |
| 2013/0183951 A1* | 7/2013 | Chien |
| 2014/0365533 A1* | 12/2014 | Debray et al. |
| 2015/0033341 A1* | 1/2015 | Schmidtler et al. |
| 2015/0067830 A1* | 3/2015 | Johansson et al. |
| 2015/0317563 A1* | 11/2015 | Baldini Soares et al. |
| 2016/0012220 A1* | 1/2016 | Padidar et al. |
| 2016/0021174 A1* | 1/2016 | De Los Santos Vilchez et al. |
| 2016/0094427 A1* | 3/2016 | Talat et al. |
| 2018/0018459 A1* | 1/2018 | Zhang et al. |
| 2018/0060068 A1* | 3/2018 | Ferrara et al. |

* cited by examiner

*Primary Examiner* — Omar F Fernandez Rivas
*Assistant Examiner* — Tri T Nguyen
(74) *Attorney, Agent, or Firm* — Thomas Horstemeyer, LLP

(57) ABSTRACT

Disclosed are various embodiments for automatically identifying whether applications are static or dynamic. In one embodiment, code of an application is analyzed to determine instances of requesting data via a network in the application. Characteristics of the instances of requesting data via the network are provided to a machine learning model. The application is automatically classified as either dynamic or static according to the machine learning model.

20 Claims, 6 Drawing Sheets

US 11,704,589 B1

AUTOMATICALLY IDENTIFYING DYNAMIC APPLICATIONS

BACKGROUND

Computer applications, such as mobile applications, may be described as being either generally static or dynamic. Static applications are largely self-contained and do not interact with a server to fetch data or content. By contrast, dynamic applications are highly dependent on data obtained from a server. Since the content of dynamic applications can continuously change, dynamic applications can pose more security risks than static applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to automatically identifying whether an application is static or dynamic through the use of static analysis and machine learning. Dynamic applications present security challenges because they rely upon data obtained via a network for much of their functionality. It can be difficult for a security administrator of an application marketplace to confirm the safety of a dynamic application as its nature could change significantly after it has been evaluated. By contrast, static applications can be automatically examined for security issues, and further security issues are unlikely to arise after the initial examination. For this reason, static applications can be approved to be added to an application marketplace or otherwise distributed following an automatic evaluation process, while dynamic applications may need closer scrutiny and more frequent evaluation.

Given that dynamic applications may need to be handled differently from static applications for risk assessment purposes, an automated approach is needed to identify which applications are dynamic. Various embodiments of the present disclosure provide such approaches, based on static analysis and machine learning, to identify dynamic applications. A static analysis can identify program-related features that are indicative of an application's dependence on network-provided content. Once these features are extracted, a discriminative machine learning model can be built using a selection of manually labeled static and dynamic applications.

Figure 1:
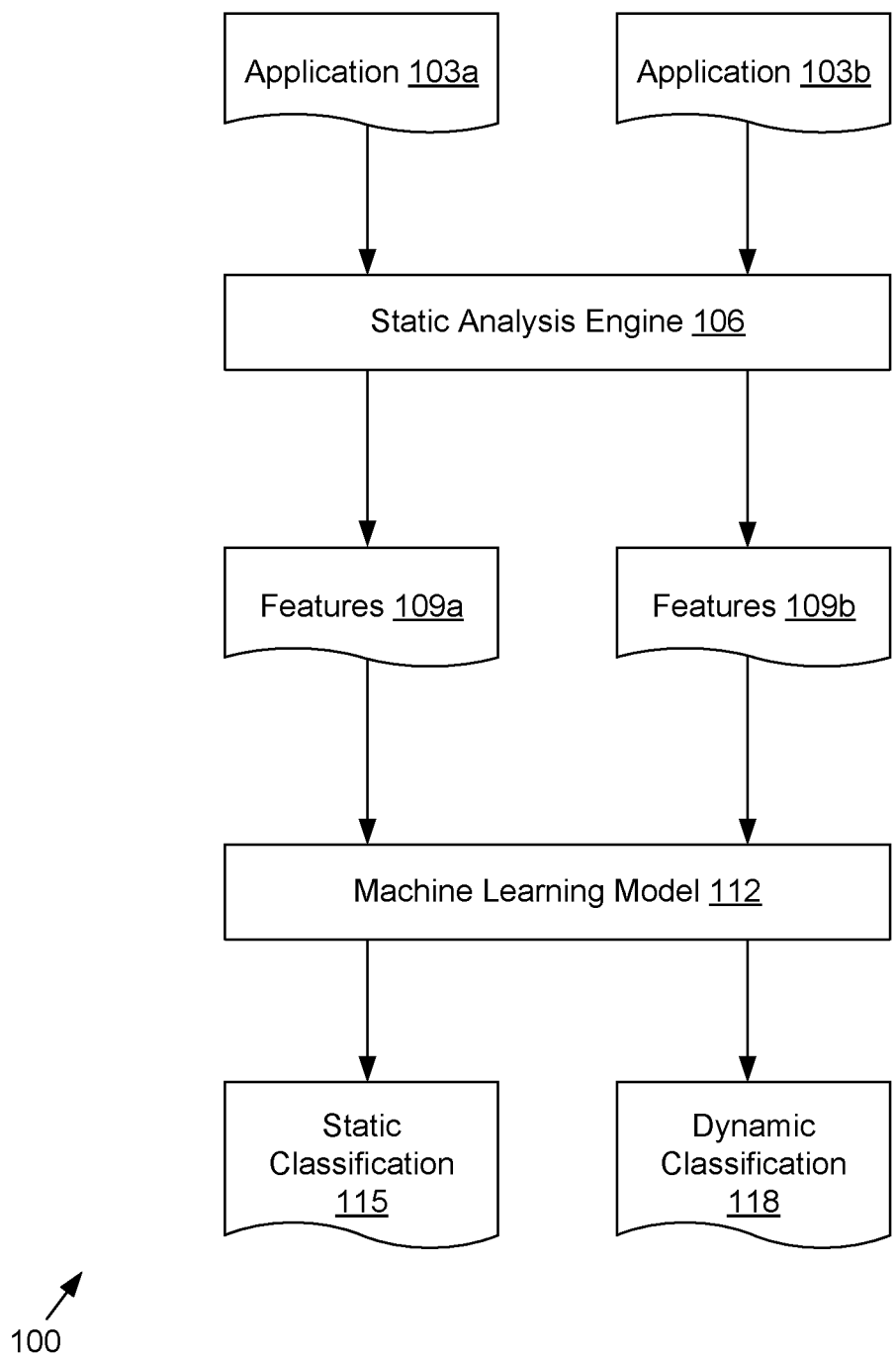
FIG. 1 is a drawing of an example scenario involving application classification according to various embodiments of the present disclosure.

Turning now to FIG. 1, shown is an example scenario 100 involving application classification according to various embodiments. Applications 103a and 103b that are initially unclassified are received for processing. The code of the applications 103 are analyzed by a static analysis engine 106. The static analysis engine 106 performs a static analysis on the binary code to identify features 109a and 109b of the respective applications 103a and 103b. The features 109 may indicate, for example, usage of network-related function calls by the applications 103 along with characteristics such as whether such calls are made within paths of execution deemed critical.

The features 109a and 109b are passed as input to a machine learning model 112 for classification. The machine learning model 112 has been trained in view of features 109 associated with a plurality of static applications and a plurality of dynamic applications that have been manually classified. Through the operation of the machine learning model 112, a static classification 115 is generated for the application 103a, and a dynamic classification 118 is generated for the application 103.

For example, the features 109a may indicate the presence of network-related function calls, but such calls may be infrequently executed relative to other functionality of the application 103a. In one scenario, the network-related function calls may be used for periodically displaying in-application advertising but not for the core functionality of the application 103a. The characteristics of the features 109a as compared with other applications 103 that have been manually classified may weigh towards the application 103a being classified as a static application, or an application that is not primarily dependent upon network content.

By contrast, the features 109b may indicate the presence of network-related function calls within a critical path of execution. In one scenario, the network-related function calls may be used for downloading code that renders the primary user interface for the application 103b. The characteristics of the features 109b as compared with other applications 103 that have been manually classified may weigh towards the application 103a being classified as a dynamic application, or an application that largely depends on network content. In the following discussion, a general description of the system and its components is provided, followed by a discussion of the operation of the same.

Figure 2:
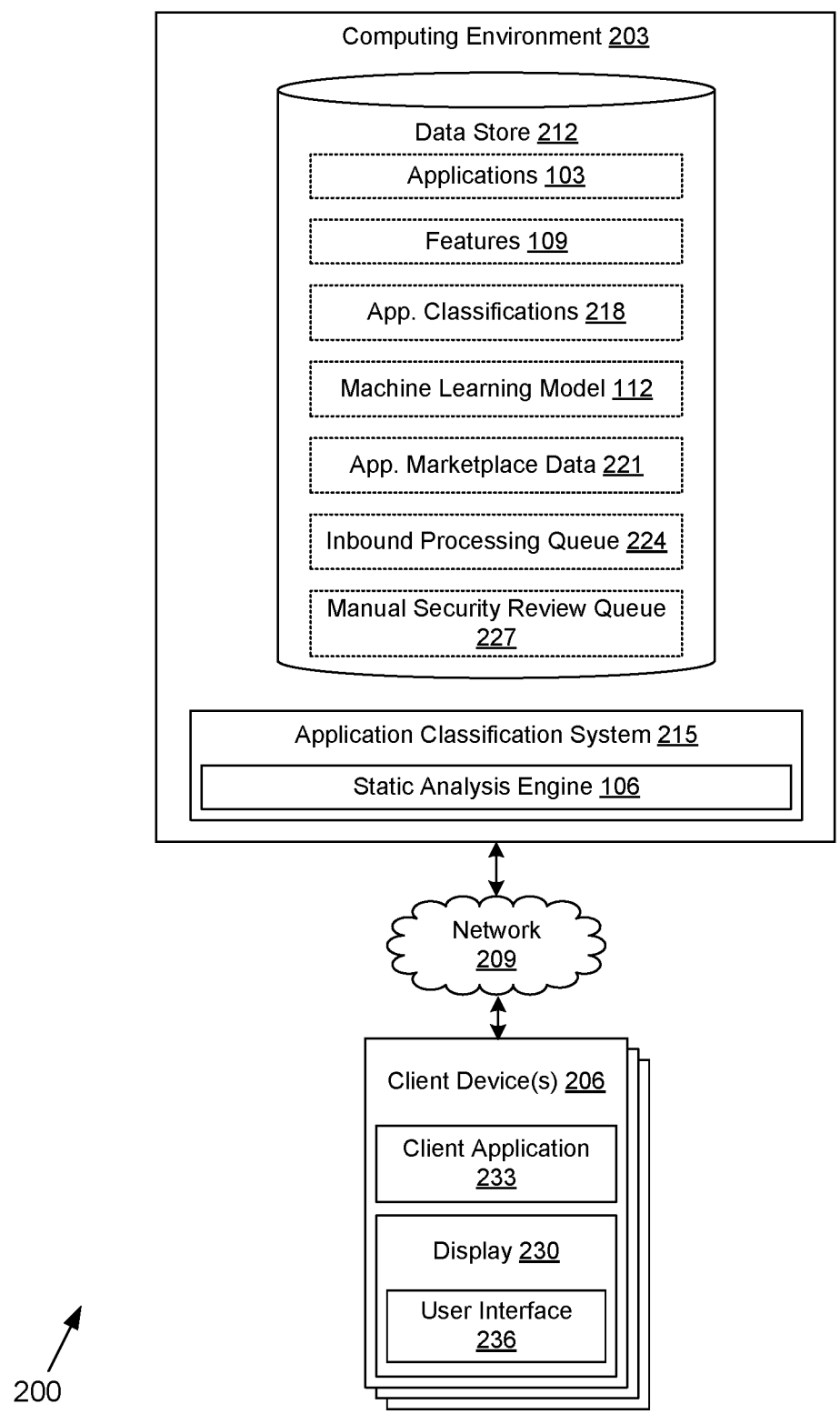
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an application classification system 215 and other applications, services, processes, systems, engines, or functionality not discussed in detail herein. The application classification system 215 is executed to generate and train a machine learning model 112 for classifying applications 103 as being static or dynamic. To this end, the application classification system 215 incorporates a static analysis engine 106 configured to perform a static analysis on the code of the applications 103, thereby identifying salient features 109 of the applications 103. The features 109 or their characteristics are provided to the machine learning model 112 in order to assign a classification.

Upon classifying an application 103 as being dynamic, the application 103 can be designated for more intensive security screening than would otherwise be required for a static application 103. Various examples of performing automatic security verifications upon dynamic applications 103 are described in U.S. Pat. Application No. 14/012,520, filed on Aug. 28, 2013, and entitled "DYNAMIC APPLICATION SECURITY VERIFICATION," which is incorporated herein by reference in its entirety. A thorough security review and/or risk assessment may be required before the application 103 can be deployed within an organization or added to an application marketplace. Also, dynamic applications 103 may be required to be more frequently evaluated than static applications 103.

The data stored in the data store 212 includes, for example, applications 103, features 109, application classifications 218, a machine learning model 112, application marketplace data 221, an inbound processing queue 224, a manual security review queue 227, and potentially other data. The applications 103 correspond to computer programs that may be classified as static or dynamic based upon their usage of code downloaded from a network 209 at runtime. The applications 103 may include binary code that is executable on a client device 206. In various examples, an application 103 is a package for ANDROID, IOS, or other platforms.

The features 109 correspond to application features extracted by way of the static analysis engine 106. For instance, the features 109 for a given application 103 may be expressed as numerical or categorical values within a vector. The features 109 may correspond to instances of usage of certain network-related function calls, and in particular, instances of usage within critical paths of execution for the application 103. The features 109 may indicate relative criticality, including estimated numbers of executions for a particular function call, and time and space complexity of a path of execution that uses a particular function call.

The application classifications 218 correspond to classifications of applications 103 as being static or dynamic. The application classifications 218 may be stored as records in the data store 212 or may follow the applications 103 based on disparate treatment for applications 103 having static classifications 115 (FIG. 1) versus dynamic classifications 118 (FIG. 1).

The machine learning model 112 corresponds to a model for classifying applications 103 as being static or dynamic, having been trained by way of features 109 extracted by the static analysis engine 106 of multiple known static applications 103 and dynamic applications 103.

The application marketplace data 221 corresponds to data backing an application marketplace where applications 103 are offered for download, sale, rental, or other forms of consumption. A multitude of developers may offer their applications 103 via the application marketplace. The proprietor of the application marketplace may be responsible for ensuring that the applications 103 made available through the application marketplace meet minimum security or risk standards. In this regard, applications 103 submitted by developers may be screened for security risks, either manually or automatically, before the applications 103 are made available.

The inbound processing queue 224 contains applications 103 that are to be processed for deployment or addition to an application marketplace. One particular form of processing to be applied includes classifying the applications 103 as being either static or dynamic by the application classification system 215. Once the applications 103 are classified, they can be screened for security risks. The manual security review queue 227 contains applications 103 that are to be processed via a manual security review. Such applications 103 may be those that are classified as dynamic applications 103 by the application classification system 215. Upon successful completion of the manual security review, the dynamic applications 103 may be deployed or added to the application marketplace. Due to their dynamic nature, the dynamic applications 103 may be resubmitted to the manual security review queue 227 at more frequent intervals than static applications 103. In some situations, both static and dynamic applications 103 may undergo an initial manual security review.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 230. The display 230 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 233 and/or other applications. The client application 233 may be executed in a client device 206, for example, to access network content served up by the computing environment 203 and/or other servers, thereby rendering a user interface 236 on the display 230. To this end, the client application 233 may comprise, for example, a browser, a dedicated application, etc., and the user interface 236 may comprise a network page, an application screen, etc. In particular, the client application 233 may be used to upload applications 103 to and/or download applications 103 from an application marketplace hosted by the computing environment 203. The client device 206 may be configured to execute applications beyond the client application 233 such as, for example, email applications, social networking applications, word processors, spreadsheets, and/or other applications.

Figure 3:
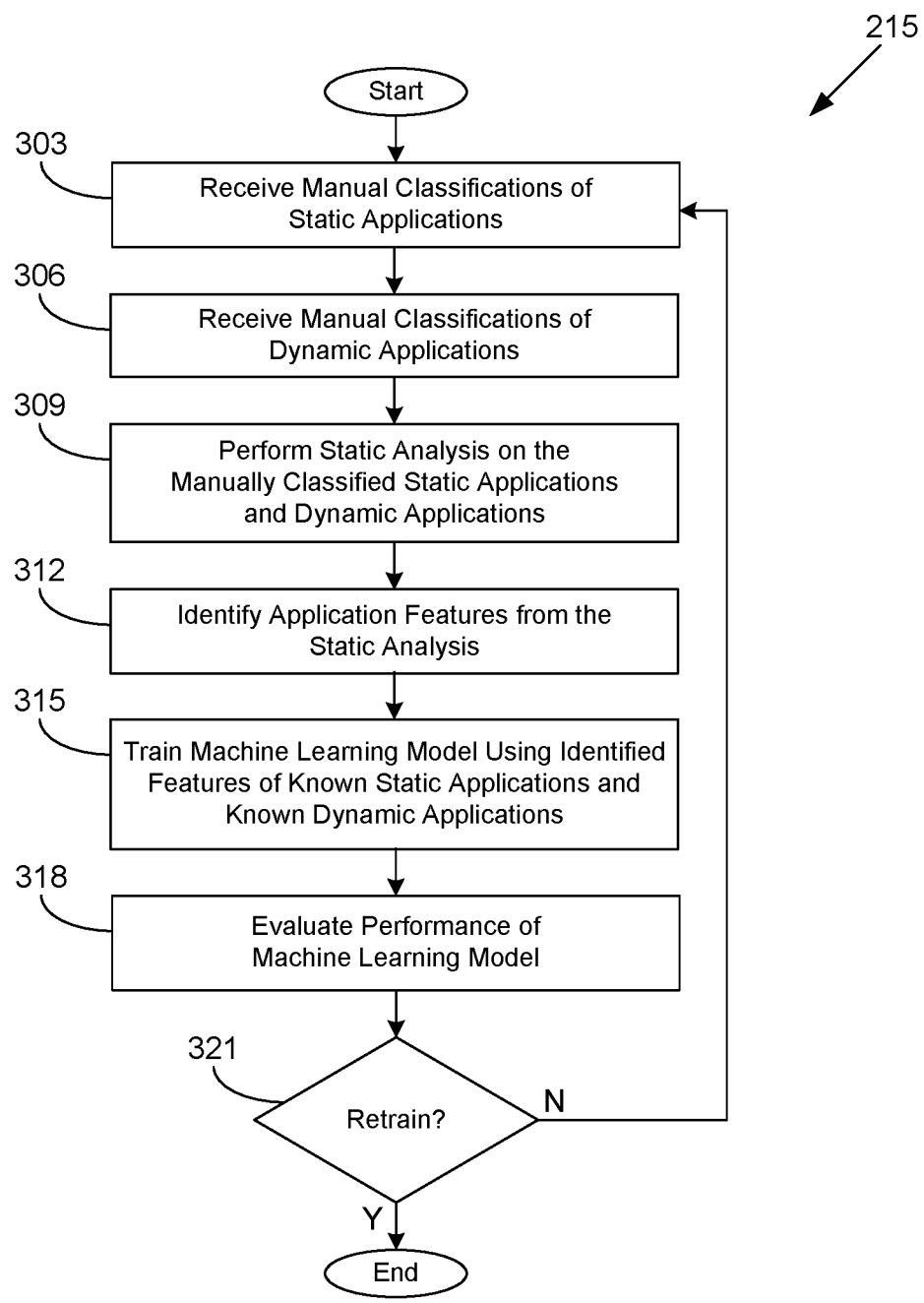
FIGS. 3 and 4 are flowcharts illustrating examples of functionality implemented as portions of an application classification system executed in a computing environment in the networked environment of FIG. 2 according to various embodiments of the present disclosure.

Referring next to FIG. 3, shown is a flowchart that provides one example of the operation of a portion of the application classification system 215 according to various embodiments. It is understood that the flowchart of FIG. 3 provides merely an example of the many different types of functional arrangements that may be employed to implement the operation of the portion of the application classification system 215 as described herein. As an alternative, the flowchart of FIG. 3 may be viewed as depicting an example of elements of a method implemented in the computing environment 203 (FIG. 2) according to one or more embodiments.

Beginning with box 303, the application classification system 215 receives manual classifications of a plurality of static applications 103 (FIG. 2). For example, an agent may manually examine and/or execute the applications 103 to determine that they do not depend on the network 209 (FIG. 2) in a significant way. In box 306, the application classification system 215 receives manual classifications of a plurality of dynamic applications 103. For example, an agent may manually examine and/or execute the applications 103 to determine that their primary functionality is embodied in code obtained at runtime via a network 209.

In box 309, the application classification system 215 performs a static analysis on the manually classified static and dynamic applications 103 using the static analysis engine 106 (FIG. 2). The operation of the static analysis engine 106 is described in further detail with respect to the flowchart of FIG. 5. In box 312, the application classification system 215 identifies features 109 (FIG. 2) of the applications 103 from the static analysis. In box 315, the application classification system 215 trains a machine learning model 112 (FIG. 2) using the identified features 109 of the known static and dynamic applications 103. In this way, the machine learning model 112 is trained to recognize which types of network calls and frequency of use and/or criticality are associated with static or dynamic applications, understanding that static applications 103 may include some network calls.

After the machine learning model 112 begins being used, the machine learning model 112 may need to be retrained periodically. For example, new network application programming interfaces (APIs) may be introduced, and applications 103 that should be classified as dynamic may be improperly classified as static because they use the new network API to obtain network content. Thus, in box 318, the performance of the machine learning model 112 may be evaluated. Additional manual classifications of static and dynamic applications 103 may be received, and the applications 103 may be evaluated using the static analysis engine 106 and the machine learning model 112 according to the flowchart of FIG. 4 to determine whether the machine learning model 112 is correctly classifying the applications 103.

In box 321, the application classification system 215 determines whether retraining of the machine learning model 112 is necessary. For example, the application classification system 215 may compare a percentage or quantity of incorrect classifications with a maximum threshold for incorrect classifications. If the threshold is met, then retraining may be necessary. If retraining is necessary, the application classification system 215 returns to box 303. Also, the ruleset of the static analysis engine 106 may be manually updated. If retraining is not to be performed, the operation of the portion of the application classification system 215 ends.

Figure 4:
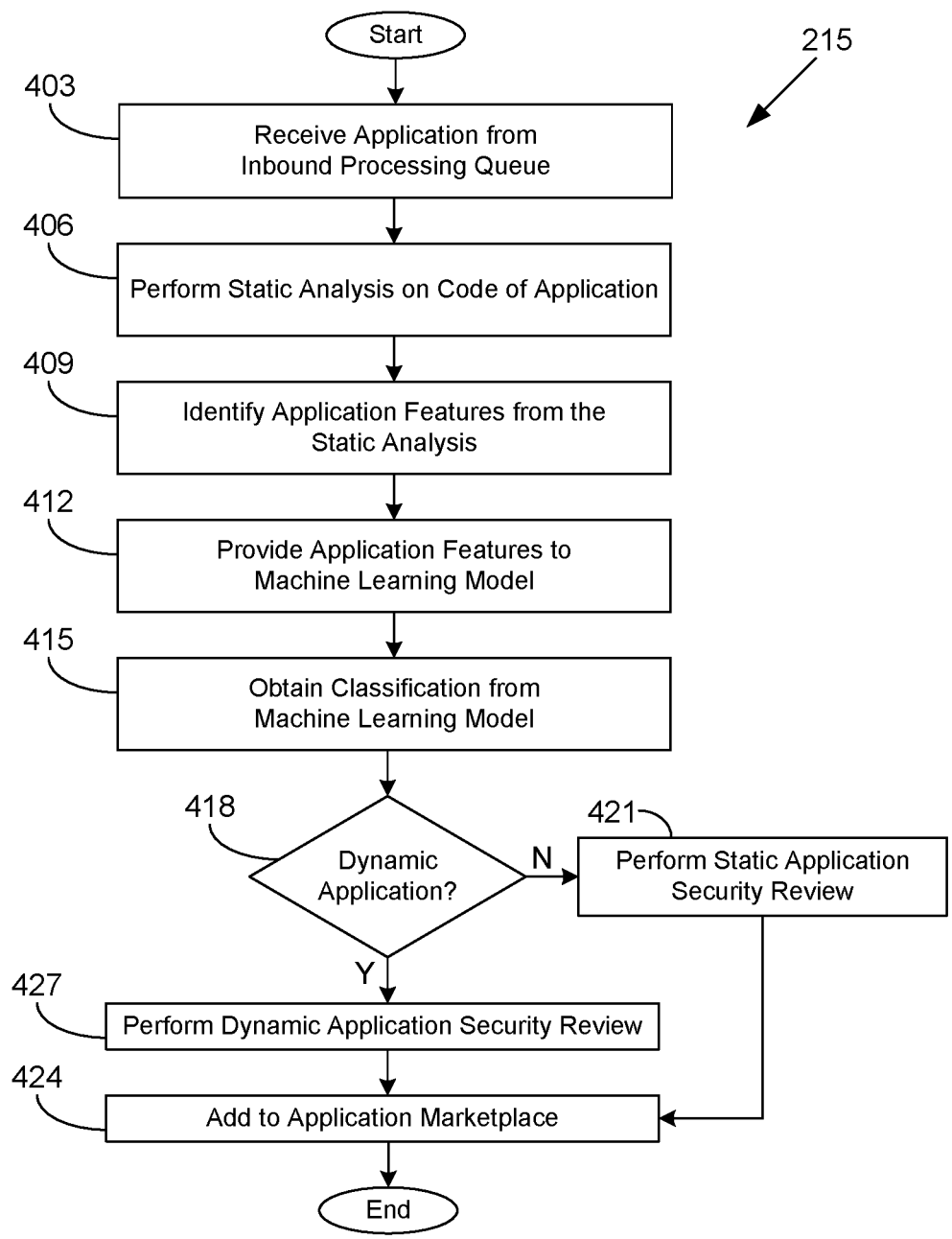

Moving on to FIG. 4, shown is a flowchart that provides one example of the operation of another portion of the application classification system 215 according to various embodiments. It is understood that the flowchart of FIG. 4 provides merely an example of the many different types of functional arrangements that may be employed to implement the operation of the portion of the application classification system 215 as described herein. As an alternative, the flowchart of FIG. 4 may be viewed as depicting an example of elements of a method implemented in the computing environment 203 (FIG. 2) according to one or more embodiments.

Beginning with box 403, the application classification system 215 receives an application 103 (FIG. 2) from an inbound processing queue 224 (FIG. 2). For example, application developers may upload their applications 103 to an application marketplace, and the uploaded applications 103 may be initially placed in the inbound processing queue 224 to begin the ingestion process into the application marketplace. In box 406, the application classification system 215 performs a static analysis on the code of the application 103 using the static analysis engine 106 (FIG. 2). The code that is analyzed may include binary code, object code, and/or source code. The operation of the static analysis engine 106 is described in further detail with respect to the flowchart of FIG. 5.

In box 409, the application classification system 215 identifies features 109 (FIG. 2) of the application 103 from the static analysis. The features 109 may be given as a vector of categorical and/or numerical values, for example, corresponding to estimated numbers of instances of certain network-related function calls. In box 412, the application classification system 215 provides the application features 109 to the machine learning model 112 (FIG. 2), which has been trained as described in connection with the flowchart of FIG. 3.

In box 415, the application classification system 215 obtains an application classification 218 (FIG. 2) of the application 103 from the machine learning model 112. Although the discussion herein has described the application classification 218 as being binary — between static and dynamic — in some embodiments, the machine learning model 112 may return a confidence value on a continuum between static and dynamic. Such a confidence value may be subject to thresholding to determine whether to treat the application 103 as either static or dynamic. In box 418, the application classification system 215 determines whether the application 103 has been classified as a dynamic application 103.

If the application 103 has not been identified as a dynamic application 103 but rather as a static application 103, the application classification system 215 proceeds from box 418 to box 421. For example, the features 109 of the application 103 may be indicative of an absence of a dependence of the application 103 on network-provided data. In box 421, the application classification system 215 causes a static application security review to be performed on the application 103. This security review may include automatic and/or manual review components. In one scenario, a static application 103 may not require a periodic security review. Assuming that the application 103 passes the automated security review, the application classification system 215 may cause the application 103 to be added to an application marketplace in box 424.

In adding the application 103 to the application marketplace, metrics relating to the static/dynamic classification may be stored in the application marketplace data 221 for search/discovery purposes or to be surfaced to users via a user interface. In one example, the application 103, as a static application, may be categorized as an "offline application" in the application marketplace data 221 so that users may easily search for and discover applications 103 that do not depend on network access for their core functionality. In some cases, the application 103 may be categorized in a multi-level classification based on network dependence (e.g., zero, low, medium, or high network-dependent applications 103, with the latter categories pertaining to dynamic applications 103).

A user interface displaying a listing of the application 103 may give some estimation of data requirements of the application 103 based upon the classification of the application 103 as static or dynamic and the features 109 discovered via the static analysis. Also, in one scenario, the application marketplace may be configured to recommend a security precaution to a user in association with a dynamic application 103 (e.g., anti-virus software, firewalling, avoiding use on certain platforms, etc.).

If the application 103 has been classified as a dynamic application 103, the application classification system 215 moves from box 418 to box 427. For example, the features 109 provided to the machine learning model 112 may be indicative of a dependence of the application 103 on network-provided data within a critical path of execution. In box 427, the application classification system 215 causes a dynamic application security review to be performed on the application 103. This security review may encompass additional automated screening and/or more intensive manual screening than what is performed on static applications 103. The application classification system 215 may add the application 103 to a manual security review queue 227 (FIG. 2) so that a manual security review can be performed. Other actions may be initiated relative to ingesting the application 103 into an application marketplace subsequent to successful completion of the manual security review, for instance, in box 424, the application 103 may be added to the application marketplace. Thereafter, the operation of the portion of the application classification system 215 ends.

It is noted that, subsequent to being added to the application marketplace, the application 103 may be reevaluated for security risks, manually and/or automatically, when the application 103 is classified as a dynamic application 103. For instance, a dynamic application 103 may be submitted for a periodic manual security review. This reevaluation may be at a greater frequency than that performed on applications 103 classified as static applications 103.

Figure 5:
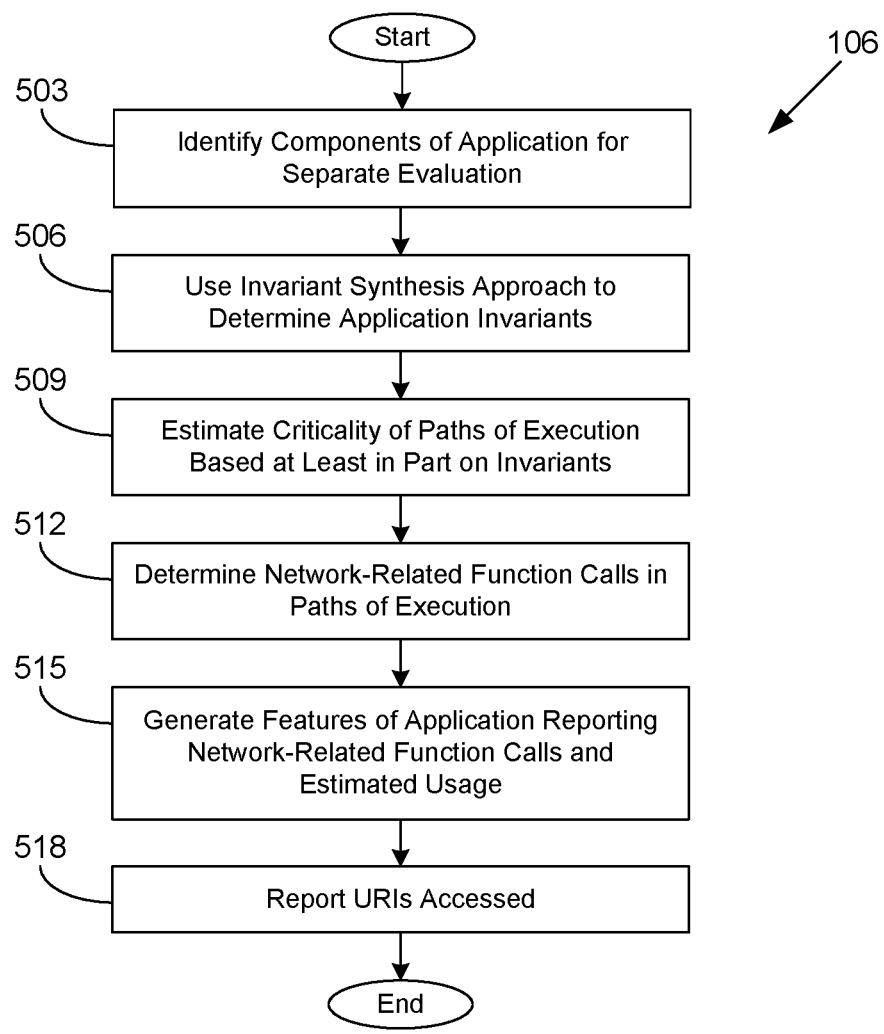
FIG. 5 is a flowchart illustrating one example of functionality implemented as portions of a static analysis engine executed in a computing environment in the networked environment of FIG. 2 according to various embodiments of the present disclosure.

Continuing now to FIG. 5, shown is a flowchart that provides one example of the operation of a portion of the static analysis engine 106 according to various embodiments. It is understood that the flowchart of FIG. 5 provides merely an example of the many different types of functional arrangements that may be employed to implement the operation of the portion of the static analysis engine 106 as described herein. As an alternative, the flowchart of FIG. 5 may be viewed as depicting an example of elements of a method implemented in the computing environment 203 (FIG. 2) according to one or more embodiments.

Beginning with box 503, the static analysis engine 106 identifies the components of an application 103 for separate evaluation. For example, for an application 103 composed of classes, the static analysis engine 106 may evaluate each of the classes separately.

In box 506, the static analysis engine 106 uses an invariant synthesis approach to determine application invariants for the application 103. The invariant synthesis approach provides, at static time, a conservative approximation of what the actual values of variables of the application 103 will be at runtime. Abstract interpretation is an example technique that may be used to estimate invariants at static time. In abstract interpretation, an internal analysis is performed for each variable that keeps track of minimum and maximum bounds. This in turn forms a lattice, and as the code executes at static time, the values of the variables converge at a fixed point within an interval.

In box 509, the static analysis engine 106 estimates criticality of paths of execution in the application 103 based at least in part on the application invariants. Criticality of a path of execution may be based at least in part on an estimated number of times the path of execution will be executed in the application 103. For example, a particular invariant may be a loop invariant value that can be used to estimate a number of times code within a looping construct (i.e., either iteration or recursion) will be executed. Thus, an estimate of complexity may depend at least in part on a loop invariant value. Code that is more frequently executed or executed a relatively high number of times may be deemed more critical. Code that is more complex with respect to time or space complexity may be deemed more critical. Techniques such as abstract interpretation may be used to determine the computational complexity of programs.

In box 512, the static analysis engine 106 determines network-related function calls in the paths of execution of the application 103. For example, various library calls may be invoked to receive data via the network 209 (FIG. 2) from a server. The static analysis engine 106 may be manually configured with a listing of pertinent network-related function calls along with relative significance to making an application 103 dynamic. For example, a network-related function call that takes a uniform resource identifier (URI) such as a uniform resource locator (URL) as a parameter may be relatively significant in classifying an application 103 as dynamic.

In box 515, the static analysis engine 106 generates features 109 (FIG. 2) of the application 103 that report the network-related function calls employed by the application 103 and their estimated usage. For example, the static analysis engine 106 may generate a vector of categorical and/or numerical values which will serve as inputs to the machine learning model 112. The estimated usage of the function calls may be reported in terms of an estimated number of instances as well as an estimated number of instances in critical paths of execution. The estimated usage may be accompanied with an estimated criticality based at least in part on time and space complexity of the corresponding path of execution.

In box 518, the static analysis engine 106 may report features 109 indicating uniform resource identifiers (URIs) that are accessed by the application 103 as determined by static analysis. These URIs may be classified as being good or bad from a security standpoint based on manual security data. Accessing "bad" URIs associated with more frequent security issues may trigger enhanced security scrutiny. Thereafter, the operation of the portion of the static analysis engine 106 ends.

Figure 6:
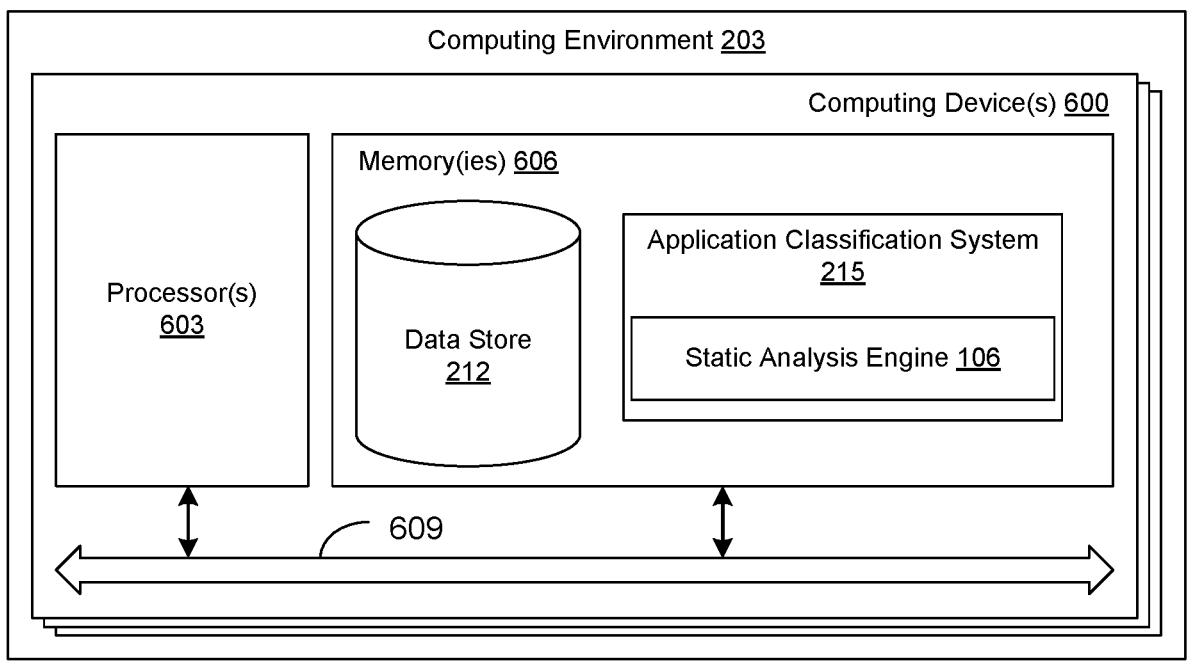
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are an application classification system 215 including a static analysis engine 106, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the application classification system 215, the static analysis engine 106, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the application classification system 215 and the static analysis engine 106. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application classification system 215 and the static analysis engine 106, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the application classification system 215 and the static analysis engine 106, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in at least one computing device, wherein when executed the program causes the at least one computing device to at least:
generate a machine learning model through a static analysis of a first plurality of applications that are manually classified as static applications and a second plurality of applications that are manually classified as dynamic applications;
receive an application from an inbound processing queue;
identify at least one first feature using a static analysis of the application, the at least one first feature being indicative of a dependence of the application on network-provided data in a critical path of execution;
identify at least one second feature using the static analysis of the application, the at least one second feature being a network call that is not indicative of the dependence of the application on network-provided data in a critical path of execution; and
automatically classify the application as a dynamic application instead of a static application using the machine learning model based at least in part on the at least one first feature as opposed to the at least one second feature.

2. The non-transitory computer-readable medium of claim 1, wherein when executed the at least one program further causes the at least one comping device to at least:
receive another application from the inbound processing queue;
identify at least one other feature using a static analysis of the other application, the at least one other feature being indicative of an absence of a dependence of the other application on network-provided data; and
automatically classify the application as a static application instead of a dynamic application using the machine learning model based at least in part on the at least one other feature.

3. The non-transitory computer-readable medium of claim 1, wherein when executed the program further causes the at least one computing device to at least designate the application as requiring a periodic manual security review in response to the application being classified as a dynamic application.

4. A system, comprising:
at least one computing device; and
at least one program executable in the at least one computing device, wherein when executed the at least one program causes the at least one computing device to at least:
identify at least one first feature using a static analysis of an application, the at least one feature being indicative of a dependence of the application on network-provided data;
identify at least one second feature using the static analysis of the application, the at least one second feature being a network call that is not indicative of the dependence of the application on network-provided data; and
classify the application as a dynamic application instead of a static application using a machine learning model based at least in part on the at least one first feature as opposed to the at least one second feature.

5. The system of claim 4, wherein when executed the at least one program further causes the at least one computing device to at least designate the application as requiring a periodic security review in response to the application being classified as a dynamic application, the periodic security review being performed at a greater frequency than for a static application.

6. The system of claim 4, wherein when executed the at least one program further causes the at least one computing device to at least:
identify an absence of the at least one feature using a static analysis of another application; and
classify the other application as being a static application instead of a dynamic application using the machine learning model based at least in part on the absence of the at least one feature.

7. The system of claim 6, wherein when executed the at least one program further causes the at least one computing device to at least designate the other application as not requiring a periodic security review in response to the other application being classified as a static application.

8. The system of claim 4, wherein when executed the at least one program further causes the at least one computing device to at least:
receive manual classifications of a plurality of static applications; and
train the machine learning model using a static analysis of individual ones of the plurality of static applications.

9. The system of claim 4, wherein when executed the at least one program further causes the at least one computing device to at least:
receive manual classifications of a plurality of dynamic applications; and
train the machine learning model using a static analysis of individual ones of the plurality of dynamic applications.

10. The system of claim 4, wherein the static analysis comprises:
identifying at least one critical path of execution in the application; and
determining a number of network-related function calls occurring in the at least one critical path of execution.

11. The system of claim 10, wherein identifying the at least one critical path of execution in the application comprises:
determining an estimated number of times a path of execution will be executed in the application; and
determining criticality of the path of execution based at least in part on the estimated number of times the path of execution will be executed in the application.

12. The system of claim 10, wherein identifying the at least one critical path of execution in the application comprises:
determining an estimated complexity of a path of execution; and
determining criticality of the path of execution based at least in part on the estimated complexity.

13. The system of claim 12, wherein determining the estimated complexity of the path of execution comprises:
determining a loop invariant value in the path of execution using an invariant synthesis approach; and
wherein the estimated complexity is determined based at least in part on the loop invariant value.

14. The system of claim 4, wherein the static analysis comprises identifying a number of calls by the application to a particular network-related library function.

15. The system of claim 14, wherein the particular network-related library function takes a uniform resource identifier (URI) as a parameter.

16. A computer-implemented method, comprising:
identifying at least one first feature using a static analysis of an application, the at least one feature being indicative of a dependence of the application on network-provided data;
identifying at least one second feature using the static analysis of the application, the at least one second feature being a network call that is not indicative of the dependence of the application on network-provided data; and
classifying the application as a dynamic application instead of a static application using a machine learning model based at least in part on the at least one first feature as opposed to the at least one second feature.

17. The method of claim 16, further comprising designating the application as requiring a periodic security review in response to the application being classified as a dynamic application, the periodic security review being performed at a greater frequency than for a static application.

18. The method of claim 16, further comprising:
identifying an absence of the at least one feature using a static analysis of another application; and
classifying the other application as being a static application instead of a dynamic application using the machine learning model based at least in part on the absence of the at least one feature.

19. The method of claim 16, further comprising:
receiving manual classifications of a plurality of static applications; and
training the machine learning model using a static analysis of individual ones of the plurality of static applications.

20. The method of claim 16, wherein the static analysis further comprises:
identifying at least one critical path of execution in the application; and
determining a number of network-related function calls occurring in the at least one critical path of execution.

* * * * *